Aug. 18, 1953     G. E. MALLINCKRODT     2,649,080
ROTARY EXPANSION ENGINE

Filed March 12, 1952     4 Sheets-Sheet 1

George E. Mallinckrodt, Inventor.
Koenig and Pope, Attorneys.

Aug. 18, 1953 G. E. MALLINCKRODT 2,649,080
ROTARY EXPANSION ENGINE
Filed March 12, 1952 4 Sheets-Sheet 2

George E. Mallinckrodt
Inventor
Koenig and Pope,
Attorneys.

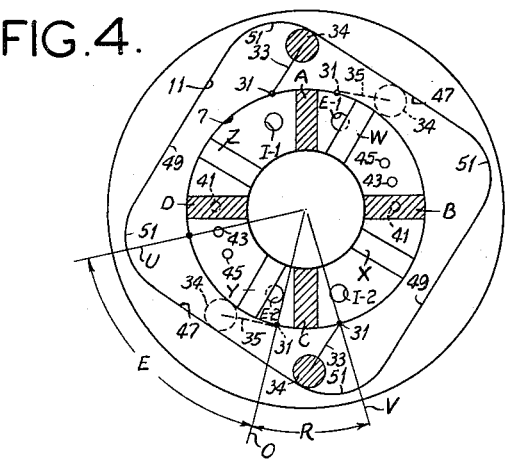

Aug. 18, 1953 G. E. MALLINCKRODT 2,649,080
ROTARY EXPANSION ENGINE
Filed March 12, 1952 4 Sheets-Sheet 4

George E. Mallinckrodt,
Inventor.
Koenig and Pope,
Attorneys.

Patented Aug. 18, 1953

2,649,080

UNITED STATES PATENT OFFICE 2,649,080

ROTARY EXPANSION ENGINE

George E. Mallinckrodt, St. Louis, Mo.

Application March 12, 1952, Serial No. 276,084

11 Claims. (Cl. 123—11)

This invention relates to rotary expansion engines capable of operating with expansive gaseous or vapor mediums and employing several rotors having multiple pistons interdigitated and operative in an annular or toroidal cylinder. It is an improvement upon the construction disclosed in my copending United States patent application Serial No. 273,392, filed February 26, 1952, for Rotary Expansion Engine.

Among the several objects of the invention may be noted the provision of an engine, the compression ratio of which may be controlled in value over a wide range of speeds so as to avoid fuel knock at any operating speed within its range; the provision of an engine of the class described which may be operated at maximum efficiency (minimum fuel consumption) at or near any such operating speed; and the provision of an engine of the class described which assumes discrete operating speeds over its speed range, the discrete values of which speeds vary by smaller increments in the lower speed ranges than in the upper ones, whereby in said lower ranges a variable-speed performance may be had, and in any range (but particularly the upper range) an inherently self-governing constant-speed performance may be had. The engine is therefore useful as an efficient power generator in automotive, aviation, and stationary applications. Other objects will be in part apparent and in part pointed out hereinafter.

The invention accordingly comprises the elements and combinations of elements, features of construction, and arrangements of parts which will be exemplified in the structures hereinafter described, and the scope of which will be indicated in the following claims.

In the accompanying drawings, in which one of various possible embodiments of the invention is illustrated, Fig. 1 is an axial section of an engine embodying the invention;

Figs. 4, 5 and 6 are diagrammatic views showing successive positions of certain piston and reverse-locking parts advanced relatively to the positions of said parts shown in Figs. 2 and 3;

Figs. 2A and 4A–6A are diagrammatic views illustrating successive positions of certain resonantly operative vibrating elements employed in the energy transfer process between certain rotors, the positions of parts in these figures corresponding to the positions of other parts shown in adjacent Figs. 2 and 4–6;

Similar reference characters indicate corresponding parts throughout the several views of the drawings.

Figure 1:
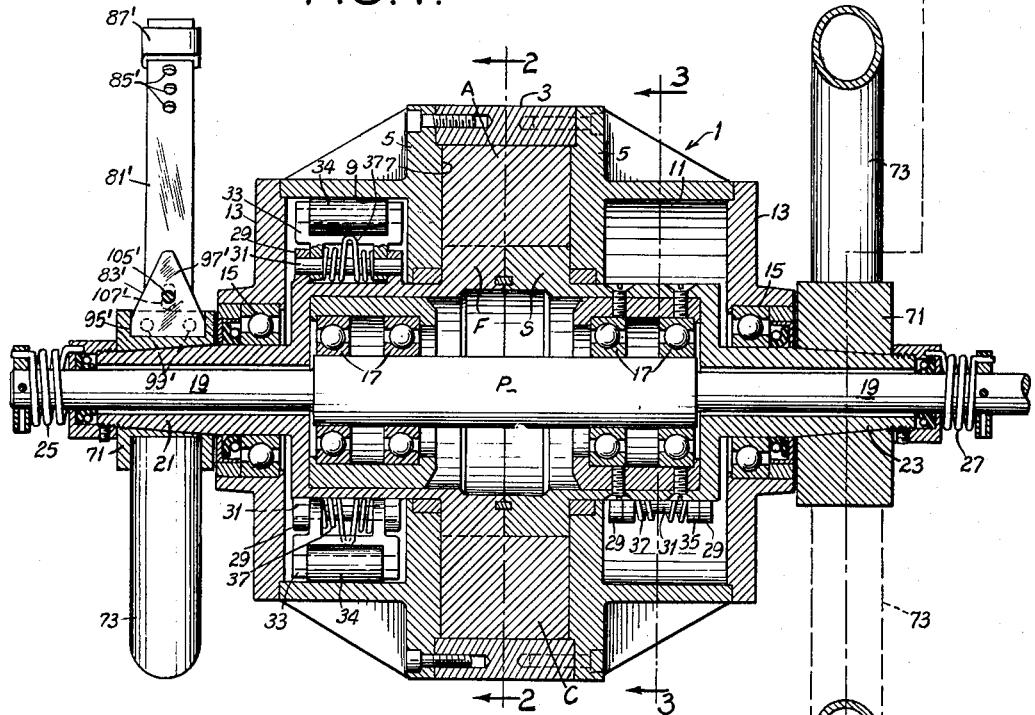

Briefly, the improvement constituted by the invention is in the provision of certain vibrator elements on the power rotors, each of which elements has an adjustable natural frequency of vibration and suitable damping means. Forced vibration is applied to each vibrating element each time that its supporting rotor decelerates to a reverse-locked position. The initiated vibration in the vibrating element on a reverse-locked rotor continues during the locking period. The other rotor, which decelerates during compression applied to the locked rotor, transfers its energy to the latter so as to accelerate it from reverse-locked position. Under conditions of resonance the reverse-locked rotor is forwardly accelerated at a time when its vibrating element interferes least with such acceleration. The result is that the rotor which is accelerating from locked position is more readily moved under said resonance conditions than it is under nonresonant conditions. Being more easily moved, the maximum compression attained is less than it would otherwise be, thereby in effect limiting the compression ratio under conditions of resonance but increasing it under conditions of nonresonance. Since the vibrating element has an adjustable but otherwise constant natural frequency of vibration, whereas the rotors are capable of various speeds (angular velocity) as determined by the position of the throttle controlling the fuel supply, there will be various rotor speeds at which resonance will occur. Therefore, the machine will have various particular or discrete speeds at which the compression ratio is limited, the limit being determined for antiknock characteristics at such discrete speeds. At all other intermediate speeds the compression ratio tends to maximize, with consequent tendency to knock.

Thus the machine, with a given rate of fuel supply, tends to stabilize its operation at one of a finite number of discrete speeds each of which is just outside of knocking range; and any given discrete speed may be approximately maintained at a particular value at which maximum efficiency of performance (minimum fuel consumption) occurs. Moreover, the machine's tendency to assume one of a finite group of discrete operating speeds serves as an inherent governing means, particularly in the range of operation wherein the values of the discrete speeds differ substantially.

Referring now more particularly to Figs. 1–7, there is shown at numeral 1 a casing consisting of a ring 3 to which are attached cheeks 5 forming an annular or toroidal cylinder 7. Extending from the cheeks 5 are housings containing cam tracks 9 and 11. Heads 13 enclose the housings and support bearings 15 for rotors F and S. Rotor F carries pistons A, B, C, D, located in cylinder 7. Rotor S carries interdigitated pistons W, X, Y, Z, also located in the cylinder 7. The pistons are slotted for suitable sealing means, the nature of which it will be unnecessary to discuss because such are known.

A power shaft P is supported upon bearings 17 within the rotors and includes extensions 19 which pass out of the casing 1 through quills 21 and 23 of the rotors. A spring 25 connects quill 21 and shaft extension 19 to form a driving connection between the rotor F and shaft P. A spring 27 also connects quill 23 and the other shaft extension 19 to form a driving connection between the rotor S and shaft P. The springs are unstressed when the pistons assume the positions shown in Fig. 2.

Each of rotors F and S carries lugs 29 for pivot pins 31. The pivot pins 31 support clevised arms. The arms on rotor F are indexed 33 and those on rotor S are indexed 35. The ends of the arms 33 and 35 carry follower rollers 34 for rolling engagement with the cam tracks 9 or 11, as the case may be. Springs 37 bias the arms 33 and 35 away from their respective rotors. Movements of the arms 33 and 35 are determined by the angular positions of the rotors F and S with respect to the cam tracks 9 and 11, respectively (compare Figs. 2 and 3).

At I–1 and I–2 (Fig. 2) are shown fuel inlet ports, and at E–1 and E–2 exhaust ports. Numeral 41 indicates ignition plugs of the glow type for high-speed operations, plugs 43 being for low-speed operations and plugs 45 for starting the device with priming of fuel.

Figure 2:
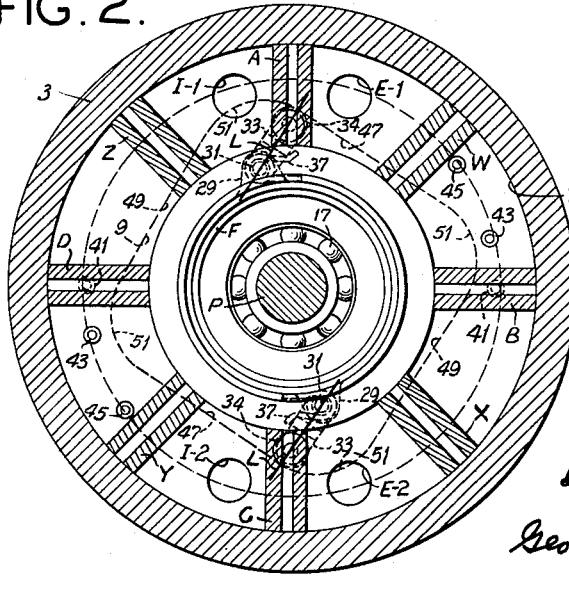
Fig. 2 is a cross section taken on line 2—2 of Fig. 1.
Figure 3:
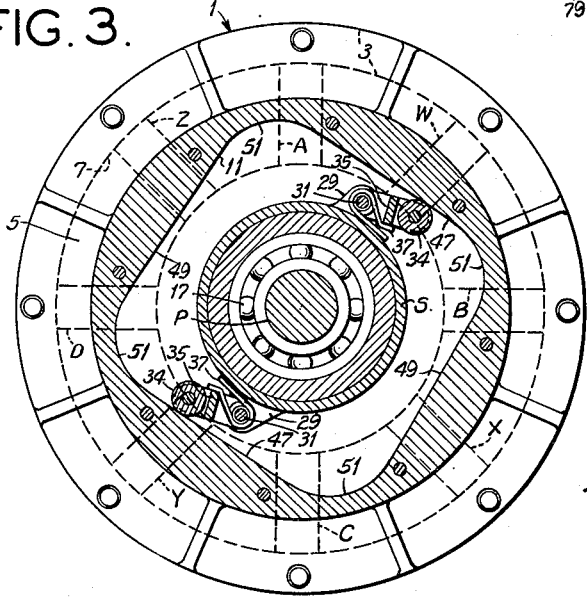
Fig. 3 is a cross section taken on line 3—3 of Fig. 1.
Figure 9:
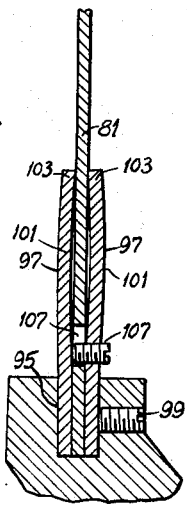
Fig. 9 is an enlarged detail section of certain spring anchors.
Figure 7:
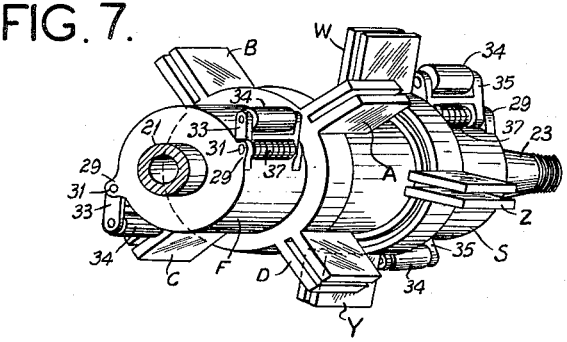
Fig. 7 is an isometric view showing certain rotors and attached pistons and reverse-locking parts.

Flats 47 and 49 and fillets 51 of the cam tracks 9 and 11 have certain relationships to the pivoted arms 33 and 35 on the respective rotors, as may be seen from Figs. 2–6. When the rotor F is in a position as shown in Fig. 2 (wherein its pistons A, C are vertical and D, B horizontal), the arms 33 are in positions wherein lines L, which pass through their pivot and roll centers, are perpendicular to the ends of flats 47. As a result, the rotor F cannot move clockwise (Fig. 2) but only anticlockwise. This reverse locks it, the reason being that there is an insufficient component of the thrust at 90° to lines L to angle inward the arms 33. When lines L are exactly perpendicular to the flats 47, there is no normal component of thrust. If the angles deviate slightly from 90° there still may not be sufficient normal thrusts to overcome the actions of springs 37. The action is similar to that of a toggle wherein the springs 37 have a large mechanical advantage in preventing inward movements of the arms 33 or 35, which occur in the reverse-locking positions such as shown in Fig. 2. It may be noted that when rotor F has advanced 90° from the Fig. 2 position, the same reverse-locking effect will occur with lines L normal to flats 49. In Fig. 3, which relates to rotor S, is shown how the arms 35 angle inward as the flats 47 of cam track 11 are traversed in making an approach to conditions such as described for rotor F in connection with Fig. 2. The action is the same in this respect for the arms 33 of rotor F as they move between reverse-locked positions.

The radius of curvature of each fillet 51 is at least slightly less than the distance from the center of a pivot pin 31 to the outermost point on a corresponding roller 34. Each arm 33 or 35 is in the perpendicular position L with respect to a flat 47 or 49 only when at the end of the flat. Thus, this arrangement prevents the springs 37 from moving the arms further outward than said perpendicular position L when in the reverse-locked position.

The progress of internal events, leaving out of consideration the action of additional exterior elements to be described, and assuming that the engine is running, is as follows:

Referring to Fig. 2, an expansion event is occurring between pistons D and Y; also between B and W, assuming ignition by plugs 43. Reaction occurs against the pistons D and B, rotor F being reverse locked for reasons stated above. Thus, rotor S is moving anticlockwise. Exhaust events are occurring between pistons Y and C; also between A and W (see ports E–1 and E–2). Suction events draw fuel in at ports I–1 and I–2 between pistons A and Z and between pistons C and X, respectively. A compression event is occurring between pistons Z and D; also between pistons B and X. Under these conditions the unit pressure of expansion is greater than the unit pressure of compression. The arms 33 of rotor F are reverse locked as shown in Fig. 2, and the arms 35 of rotor S are as shown in Fig. 3.

As expansion progresses, the conditions illustrated in Fig. 4 occur in which the said events are about terminated. Then, as shown in Fig. 5, the expansion event dissipates by exhaust through ports E–1 and E–2. The compression events between pistons Z and D (also X and B) then have a sufficient pressure to move the pistons D and B anticlockwise, thus accelerating the rotor F. The arms 33 at this time leave their reverse-locked positions while arms 35 move toward their reverse-locked positions. The cycle is completed, as shown in Fig. 6, by the pistons W, X, Y, Z having assumed the formerly reverse-locked positions of pistons A, B, C, D as the latter are accelerated. At this time the arms 35 are in reverse-locked positions, thus reverse locking the rotor S. It will be noted that there are four reverse-locked positions for each rotor.

In Fig. 4 lines U and V, which subtend 90°, indicate the travel of centers of pins 31 of one of the arms 33 or 35 during a cycle of operations, i. e., between reverse-locked positions. At line O arm 33 or 35 (as the case may be) is angled a maximum towards its rotor. As a center of a pin 31 of an arm 33 or 35 moves from line U, potential energy will be gradually stored. This potential energy is relatively rapidly converted to kinetic energy in the rotor as the center moves from line O to line V. The angle during which energy storage occurs is indexed E, and the angle during which energy is released is indexed R. Angle E should preferably be substantially greater than angle R, and in the present embodiment is of the order of twice as large. The result of this arrangement is that as either rotor F or S moves through the compression event, it receives a rapid influx of kinetic energy (converted from potential energy) which assures that its pistons can move up into and take the reverse-locked positions of the pistons of the other rotor. At the same time, the other rotor is storing potential energy relatively slowly, so that this rotor is readily moved out of its reverse-locking position in response to the action of the other rotor as it approaches such position.

With regard to the spark plugs, each is of the continuously ignited type such as a glow plug, ignition being timed as a charge is presented to the plug. Thus if the plugs 41 are ignited, the charge is presented earlier for ignition. The plugs 41 are therefore excited under high-speed conditions. Plugs 45 are excited only under starting conditions.

The torque of the rotor F as it is driven by an expansion event is resiliently delivered to the shaft P through spring 25; whereas the torque of the rotor S as it is driven by means of an expansion event is resiliently delivered to the shaft through spring 27. Starting may be accomplished by cranking the shaft P at a speed near the natural frequency of oscillation of the system constituted by the rotors and their attached parts. Incipient relative movements between the rotors, required to build up the oscillations to a point that the operating events occur spontaneously, are brought about by reason of the varying resistances of the rotors as their rollers 34 traverse the cam tracks.

It will be understood that by a reverse-locking portion on a cam track is meant a portion so formed with respect to a roller 34 (or the like) that any tendency for a rotor to go backward under the forces involved will not result in springing the arm in toward the rotor. For example, in the absence of any springs a right-angular relationship such as shown would need to be maintained between line L and a tangent portion of the cam upon reverse locking, but with springs such as 37 this exact perpendicular relationship needs not to be exactly obtained for reverse locking.

Centrifugal force, as well as springs 37, tends to move the arms such as 33 outward. As the arms approach their reverse-locking positions they have a wedging action against the flats such as 47 under this centrifugal force. The resulting reaction is applied at the pins 31 to rotating the rotor upon which said arms 33 are pinned. In addition, considering the arms and rollers to have considerable mass, the moment of inertia of a rotor which is decelerating under compression will in effect be increased. These two effects facilitate the advance of whichever rotor is approaching reverse-locking position, so that it may fully displace the rotor which is being accelerated from such position.

Figure 8:
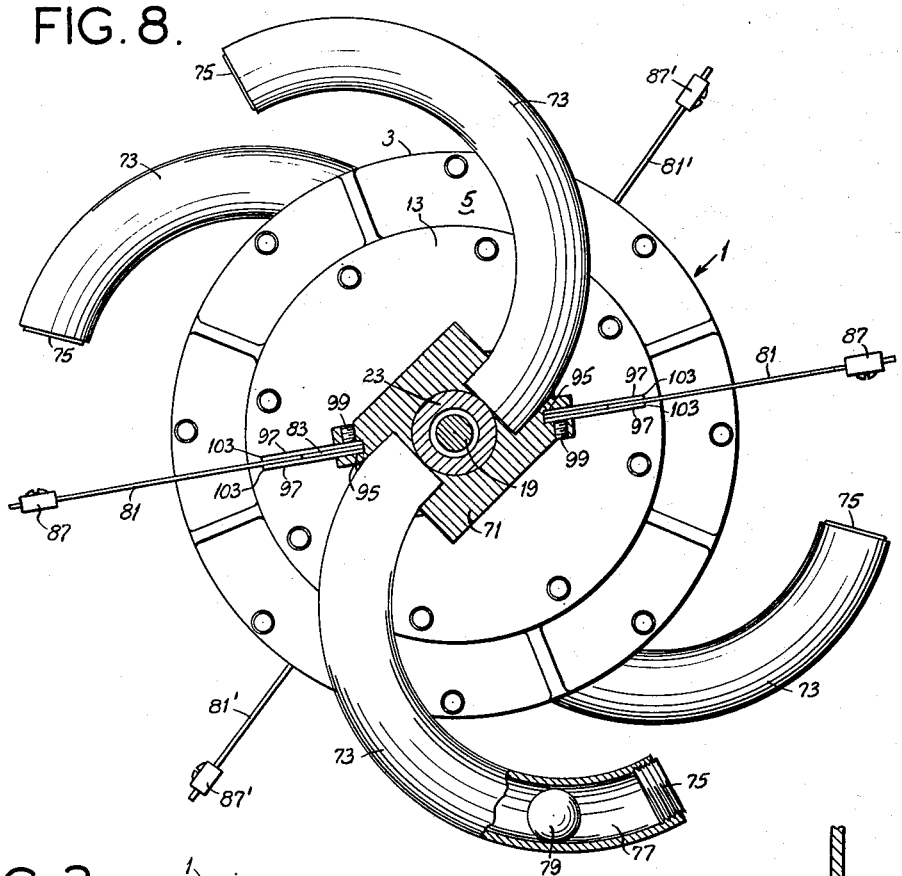
Fig. 8 is a cross section taken on line 8—8 of Fig. 1.

Attached to the quills 21 and 23 are identical inertia mechanisms. The mechanism attached to quill 23 (Figs. 1 and 8) is constituted by a hub 71 from which extend opposite semicircular hollow arms 73, plugged at their ends as shown at 75. Within an inner passage 77 of each arm 73 is a spherical ball 79, composed of suitable heavy material such as tungsten steel or the like. The inside diameter of each passage is only slightly larger than the diameter of the respective ball. Therefore, the balls may move as loose pistons in the passages with buffering or dashpot action from the contained air. A small amount of lubricant is employed in each passage. The concavities of the pipes are forward with respect to their rotations, which may be taken to be anticlockwise (Fig. 8).

Anchored in the hub are two flat cantilever springs 81, composed of beryllium copper or the equivalent. Their planes are axially located. These are tapered, as indicated at 83, and provided with openings 85 for adjustably positioning masses 87. The natural frequency of vibration of the springs normal to their planes may be controlled by the positions of the weights.

Each anchoring means is constituted by a slot 95 in which the spring 81 is held between two additional short spring pieces 97. Set screws 99 clamp the springs 97 with the spring 81 sandwiched therebetween. The springs 97 are for purposes of adjustably damping the vibrations of spring 81, said springs 97 being bowed as indicated at 101. This normally biases their ends 103 against the sides of the spring 81. Biasing action may be relieved by spreading apart the springs 97. This biasing is accomplished by means of a set screw 105 threaded through one spring 97 and engaging the other. An opening 107 is provided in the spring 81 to permit passage of the set screw 105 for the purpose. When the set screw is retracted, the springs 97 have a maximum bias toward spring 81 and effect maximum frictional damping. When the set screw 105 is threaded inward, the springs 97 may be gradually separated so as to adjust the amount of damping action.

Similar inertia mechanism is used on quill 21. A further description of it is unnecessary, since its construction may be traced from the above by noting that parts corresponding to those of the inertia mechanism already described have the same numbers in the drawings, except that the appropriate numbers are primed.

The functions of the inertia mechanisms are described below in connection with Figs. 2A, 4A–6A, and the following exemplary table:

Table

| Sum of R. P. M. of Rotors F and S | Piston Strokes Between Rest Positions (per Minute) | Spring Oscillations at Piston Rest and per Stroke |
|---|---|---|
| 6,000 | 24,000 | 1 |
| 3,000 | 12,000 | 2 |
| 2,000 | 8,000 | 3 |
| 1,500 | 6,000 | 4 |
| 1,200 | 4,800 | 5 |
| 1,000 | 4,000 | 6 |
| 857.1 | 3,428.5 | 7 |
| 750 | 3,000 | 8 |
| 666.6 | 2,666.6 | 9 |
| 600 | 2,400 | 10 |
| 545.4 | 2,181.8 | 11 |
| 500 | 2,000 | 12 |
| 461.5 | 1,846.1 | 13 |
| 428.5 | 1,714.2 | 14 |
| 400 | 1,600 | 15 |
| 375 | 1,500 | 16 |
| 352.9 | 1,411.7 | 17 |
| 333.3 | 1,333.3 | 18 |
| 315.7 | 1,263.1 | 19 |
| 300 | 1,200 | 20 |
| 285.7 | 1,142.8 | 21 |
| 272.5 | 1,090 | 22 |
| 260.7 | 1,043 | 23 |
| 250 | 1,000 | 24 |

Figure 10:
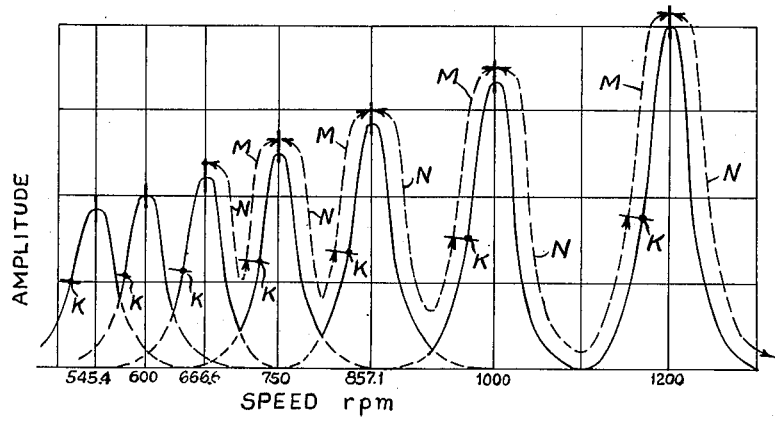
Figs. 10 and 11 are illustrative charts of amplitudes of vibrator elements plotted against rotor speeds, Fig. 11 being a continuation of Fig. 10 and drawn to one-fifth scale of that of Fig. 10.
Figure 11:
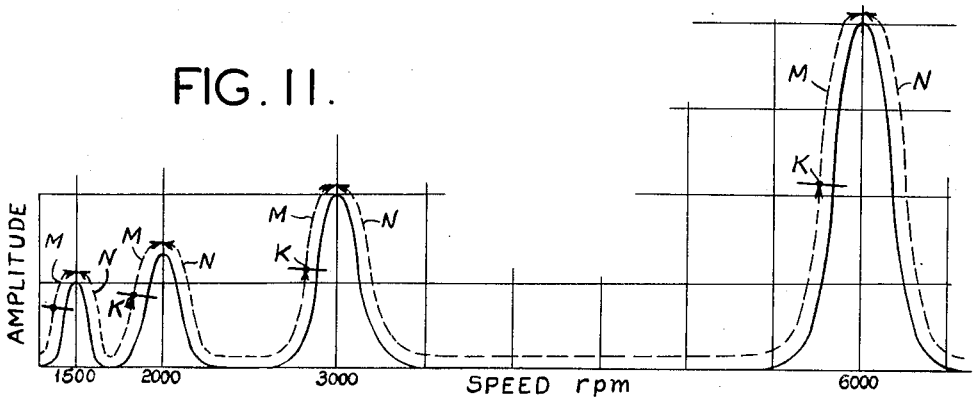

The above table is constructed for a natural frequency for the springs 81 and 81' of 24,000 cycles per second. Conditions corresponding to lines 1–4 of the table are illustrated in Fig. 11 (reading from right to left), and conditions corresponding to lines 5–11 of the table are illustrated in Fig. 10 (reading also from right to left). Certain of the abscisses of Figs. 10 and 11 indicate certain speeds shown in the first column in the table, and the ordinates indicate amplitudes of vibration of the springs 81 and 81' occurring at resonance at these speeds. Note that the amplitudes increase with speed at resonance. Each loop shown, at its peak, represents a condition of resonance between certain of the vibrations of a spring and the frequency of piston strokes. It will be noted that each piston stroke for each event performed by it, such as compression, expansion, exhaust and suction, requires one quarter revolution so that the values of the entries in the middle column of the table are four times the values shown in the left-hand column. The entries in the right-hand column are 24,000 divided by those of the middle column.

Figure 2A:
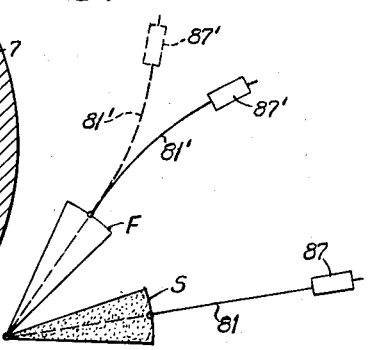

Operation of the vibratory spring mechanisms will now be described in connection with diagrammatic Figs. 2A and 4A–6A, which correspond to the positions of the piston and reverse-locking parts shown in Figs. 2 and 4–6, respectively. Referring first to Figs. 2 and 2A, the pistons A, B, C, D on rotor F are reverse locked, and pistons W, X, Y, Z are advancing anticlockwise. Obviously, pistons A, B, C, D on rotor S were decelerated before reaching the rest position, which enforced a forward movement of each spring 81' to the initial dotted line position shown in Fig. 2A. After an interval the restoring force of each spring 81' drives it back to the solid line position. At this time each spring 81 may be assumed to be in the position shown.

In Fig. 4, pistons W, X, Y, Z have advanced and under the compression event are decelerated. This drives each spring 81 to the position shown in Fig. 4A, whereas at this time each spring 81' according to its natural resonant frequency has been restored to its initial position shown in solid lines in Fig. 4A. I here assume conditions as specified in the first line of the table.

As shown in Fig. 5, the compression event has reached a stage wherein pistons A, B, C, D are moved from their reverse-locked positions and the pistons W, X, Y, Z follow toward their reverse-locked positions. At this moment the balls in members 73 connected with pistons W, X, Y, Z are out against their stops 75, so as to increase the effective moment of inertia of the overtaking rotor. Since pistons A, B, C, D are accelerating, the balls in the members 73 are thrown back so as to decrease the effective moment of inertia of the rotor F. Thus rotor S is assured of overrunning rotor F so as at least to reach the reverse-locked position which will be discussed in connection with Fig. 6.

Referring to Fig. 5A, it will be seen that as the following rotor S drives the rotor F, each spring 81' again swings back under its restoring force. At this time each spring 81 bends forward due to the deceleration of the rotor S, to which it is attached. This maximizes the differences in effective moments of inertia between the rotors F and S, the rotor F having the least.

Referring to Fig. 6, the pistons W, X, Y, Z have reached reverse-locking position and the pistons A, B, C, D have been accelerated under the expansion event. The vibratory conditions of springs 81' and 81 are then reversed (Fig. 6A) with respect to what they were in Fig. 2A. That is, each spring 81 vibrates from its initial forwardly deflected dotted-line position back to its solid line position, whereas each spring 81' may be assumed to be centralized. The above events having consumed 90° of movement, a new cycle is about to be initiated wherein rotor S is reverse locked and rotor F overtakes.

Ordinarily the hysteresis in each spring 81 and 81', taken together with the windage caused by their vibrations and rotations, exerts sufficient damping action to prevent damaging increase in amplitude under the forced vibrations effected by starting and stopping of the rotors; but if insufficient or of the wrong value, the damping mechanism screws 105 may be suitably adjusted. It will be understood that the resonant frequency of each spring 81 or 81' can be controlled by adjusting the radial positions of the respective masses 87 or 87'.

Referring now to Fig. 11 and the above table, assuming that the spring has a natural frequency of 24,000 cycles per minute, it will be seen that there is a resonant frequency condition at 6,000 R. P. M. or 24,000 piston strokes per minute, corresponding to one cycle of spring movement for each period of piston rest; or at 3,000 R. P. M., and 12,000 strokes per minute, the springs at resonance will each execute two cycles during rest of a piston. At 2,000 R. P. M. and 8,000 strokes per minute, the springs at resonance will execute three cycles during rest of a piston; and so on down the table. Moreover, the higher entries in the table correspond to higher amplitudes of vibration, as shown in Figs. 10 and 11. The higher these amplitudes, the greater is the difference between the effective moments of inertia of the rotors during energy transfer. This results in increasingly offsetting the normal tendency for the compression ratio to increase with speed. Thus this ratio is under control even at very high speeds.

At any speeds other than the critical ones shown in the first column, interference sets in and resonance deteriorates, with the result that the stationary pistons are less easily moved from their reverse-locking positions in response to compression from a following piston. This tends to raise the compression ratio; and if the deviation from resonant speed is sufficient, knocking may set in. Thus in Figs. 10 and 11 certain critical points K exist, above which any increase in resonance will result in reduction in the compression ratio and below which there will result an increase. Depending upon the fuel supply, there will be an equilibrium point in the range M, so that, corresponding to each rate of fuel delivery, the engine will automatically seek an equilibrium point above K and on the left of an appropriate one of the resonant frequency loops shown. If it tends to drift to a higher speed, it will tend to lose power and return to the speed at the equilibrium point. Also, it will operate with a tendency to knock and lose power at any points below K on the left sides of the frequency curves; and if it is allowed to enter such a range (as by throttle decrease) it will rapidly drop down to a speed corresponding to another equilibrium point in the range M on the left side of the next frequency curve. The transition range from K on the left side of one frequency curve to the peak of the next one below is indicated by arrows N. Once the transition range is entered after a critical throttle decrease, no further throttle decrease is necessary to have the speed decrease rapidly throughout the range N. Thus there are finite separations between throttle positions for range M.

If the engine is operating at an equilibrium point in a range M on the left side of a given frequency curve and provided with more fuel by opening the throttle, the equilibrium point will move upward toward the crest of the frequency curve. If the equilibrium point passes over the crest, then the engine will rapidly accelerate to the next equilibrium point above K on the next frequency curve.

An important feature of the invention is that within the range of adjustment of the equilibrium point in a non-knocking range M, there is a point at which maximum efficiency occurs, i. e., minimum consumption of fuel for the power produced. This point of highest efficiency can be detected by closing the throttle sufficiently to produce knocking at a given speed and then reopening it only sufficiently to cause knocking to cease. Or, a pressure gage may be attached to the combustion chamber which will supply compression pressure readings, and knowing the proper pressure for maximum efficiency for each frequency curve, the proper pressure condition may be maintained by suitable manipulation of the throttle.

It will be observed from the table that the speed differences between resonant frequency conditions become smaller as the speed drops. Thus the engine is applicable in the lower speed ranges for operations in which a relatively smooth transition may be desired between resonance conditions.

On the other hand, in the higher ranges of speed, the speed differences between resonant frequencies are relatively large. Under such conditions, the engine is applicable to apparatus in which a constant speed of operation is desirable. The advantage of the engine under these applications is that it is practically self-governing at or near the critical resonant frequencies. Equilibrium will automatically be maintained within the conditions represented by the arrows M, simply by setting the throttle for a speed at or near one of the conditions K. If the throttle is closed, the speed will rapidly drop down to a preceding condition of resonance; but by opening it slightly maximum efficiency may be obtained. By opening it sufficiently succeeding higher resonance speeds may be attained.

It is to be understood that the figures such as 2A, 4A–6A, 4–6, 10 and 11 are of a diagrammatic nature for purposes of explanation. It will also be understood that the above table is for a set of speeds which are set forth by way of example and not limitation. It is also to be understood that in principle the invention is not limited to the particular number of pistons shown, and that by obviously implied modifications may be carried out with other numbers of pistons on the rotors, for example, two on each rotor; or more than four if the diameter of the machine is made sufficiently large.

It will be understood that, although the vibrating elements 81 and 81' are disclosed as resilient cantilever arms, other equivalent resilient elements may be used, or the arms may themselves be rigid and pivoted to the respective rotors, the resiliency being obtained by suitable auxiliary centering springs. It is preferable, as disclosed, to employ oppositely located vibratory elements on each rotor for their mutual counterbalancing effects. It will also be understood that in cases of some designs the inertia devices such as 73, 75, 79 are unnecessary and may be omitted. This is because the actions of the reverse-locking arms 33 and 35 in angling in and out have a similar, and in some cases, a sufficient effect for the purpose.

It may also be noted that at each speed there is a collision process duration time, from start to end. During a fraction of this time the compression pressure might be critical or above with respect to knocking. This fraction tends to be relatively larger at high speeds than at low speeds. This tendency is, however, counteracted by the fact that a single oscillation of the vibrating elements at high speeds occurs over a relatively larger fraction of the collision period.

It will be clear from the above that, if it were not for the compressive charge between two of the approaching pistons on the two rotors, pistons would collide by contact and energy be transferred. With the compressive charge the energy is likewise transferred but the pistons do not touch one another. The term "collision event" is used herein in the sense that two pistons approach one another to transfer energy through the compressive charge between them.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. A rotary machine comprising at least two cooperating rotary systems, means for effecting collision events between them, wherein alternately one system advances upon the other to effect such an event and the other system may recede, means operative between collision events to prevent the rotary systems from reversing, and a substantially freely vibratory mass resiliently connected with each rotary system.

2. Apparatus made according to claim 1, wherein the natural resonant frequencies of said masses are substantially equal.

3. A rotary piston engine comprising two cooperating rotary systems, pistons for effecting compressive events between them, wherein alternately one system advances upon the other to effect such an event and the other system may recede, reverse-locking means operative at intervals between compressive events temporarily to hold the pistons at rest, and a substantially freely vibratory mass resiliently connected with each rotary system.

4. Apparatus made according to claim 3, wherein the natural resonant frequencies of said masses are substantially equal.

5. A rotary piston engine comprising two cooperating rotary systems, pistons for effecting compression events between them, wherein alternately one system advances upon the other to effect such an event and the other system may recede, reverse-locking means operative between compression events temporarily to hold the pistons at rest, and oppositely located vibratory masses resiliently connected with each rotary system.

6. Apparatus made according to claim 5, wherein the natural resonant frequencies of all of said masses are substantially equal.

7. A rotary piston engine comprising two cooperating rotary systems, pistons for effecting suction, compression, expansion and exhaust events between them, wherein alternately one system advances with respect to the other in response to an expansion event to effect a compression event, the other system being adapted to recede upon sufficient compression, reverse-locking means operative in response to expansion events adapted temporarily to hold the pistons stationary against compression, whereby the advancing system decelerates during the compression event, and a mass resiliently connected to each rotary system and vibratory in the general direction of rotation and having a natural resonant frequency, whereby the engine will operate according to its rate of fuel supply at discrete speeds which are inversely proportional to whole numbers of oscillations executed by each mass during piston rest.

8. Apparatus made according to claim 7, including means for adjustably changing the natural resonant frequency of said vibratory masses.

9. Apparatus made according to claim 7, including an adjustable damping device associated with each vibratory mass.

10. Apparatus made according to claim 8, including an adjustable damping device associated with each vibratory mass.

11. Apparatus made according to claim 7, wherein said masses are duplicated as counterbalancing pairs on each rotor.

GEORGE E. MALLINCKRODT.

No references cited.